Nov. 4, 1941.  F. RAMPACHER  2,261,699
RECTIFIER ARRANGEMENT
Filed July 27, 1940
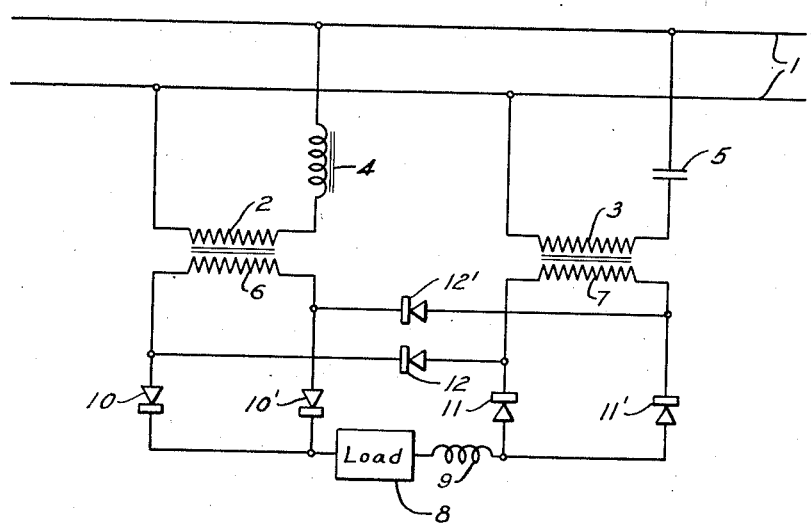
WITNESSES:
INVENTOR
Fritz Rampacher.
BY
ATTORNEY Patented Nov. 4, 1941

2,261,699

UNITED STATES PATENT OFFICE 2,261,699

RECTIFIER ARRANGEMENT

Fritz Rampacher, Berlin-Charlottenburg, Germany, assignor to Westinghouse Electric & Manufacturing Company, East Pittsburgh, Pa., a corporation of Pennsylvania Application July 27, 1940, Serial No. 348,004
In Germany June 29, 1939

3 Claims. (Cl. 175—363)

This invention relates to a rectifier arrangement to be connected to an alternating-current supply circuit.

If a direct current is required in cases where only a single-phase alternating-current supply circuit is available it is often disadvantageous that the direct current produced by the single-phase rectifier presents a pronounced ripple. It is true that the direct current could be smoothed in the direct-current circuit to a certain extent by means of reactors or selected circuits; however, these smoothening means would be very expensive and would have to be amply dimensioned owing to the pronounced ripple. For this reason a known arrangement is employed in which two parallel-connected rectifiers are arranged at the direct-current side, which rectifiers are so connected to the single-phase supply circuit through phase shifting means that the alternating voltages supplied to the rectifiers are substantially 90° out of phase. A four-phase rectification with the corresponding ripple is thus obtained. In this connection it may be pointed out that the single-phase double-way rectification effected with the aid of two single-phase rectifiers corresponds strictly speaking to a rectification effected with the aid of a two-phase rectifier system.

The known arrangement employs in the two individual rectifiers a so-called neutral point connection in which the common cathode circuit of both valves forms the one pole and the central tap of the transformer secondary winding the other pole of the direct-current circuit. In this case the transformers are utilized to a very slight extent, since always only one half of the winding carries current momentarily. The entire construction is therefore relatively expensive, besides also the central tap requires a particular construction of the transformer. It might also be possible instead of using the neutral point connection for the parallel transformers to employ the known Graetz-connection which does not require a central tap of the transformer and which ensures a better utilization of the windings. However, this has the disadvantage that eight valves would be necessary so that with respect to the neutral point connection no advantage would be obtained.

The present invention relates therefore to a rectifier arrangement having also two parallel transformers connected through valves to a common direct-current circuit, the transformers being supplied with energy from a single-phase power circuit through phase shifting means. In contradistinction to the known arrangements described above the arrangement according to the invention presents the advantage that it may be developed from the ordinary transformers without neutral point tap and in which, however, a smaller number of valves are employed than are necessary in the Graetz-connection. In the connection according to the invention only six valves are necessary. The terminals of the secondary winding of one transformer are connected according to the invention with the positive conductor and those of the secondary winding of the other transformer to the negative conductor of the direct-current circuit and the secondary windings are then connected to each terminal through valves which have all the same conducting direction with respect to the direct-current circuit. The use of the invention is not restricted in any manner. It may be employed to a particular advantage, for instance, to supply incandescent lamps for railway purposes with current, for which only a single-phase current of 16⅔ periods is available.

In the accompanying figure is shown an embodiment of the invention in diagrammatic form.

Referring to the single drawing, I denotes the alternating-current supply circuit. The primary windings 2 and 3 of both parallel transformers are connected through phase-shifting means in such a manner to the supply circuit I that the voltages in both windings are approximately 90° out of phase. The resistor 4 and the capacitor 5 are employed as phase shifting means; however, also any other suitable means may, of course, be used.

The secondary winding 6 of the left-hand transformer corresponding to the winding 2 is connected through the valves 10 and 10' to one pole of the direct-current circuit consisting of the current-consuming device 8 and the reactance coil 9. The other pole of the direct-current circuit is connected to the secondary winding 7 of the right-hand transformer through valves 11 and 11'. The conducting direction of the valves which may be designed in any suitable manner, for instance, as dry rectifier is so chosen that the direct current can flow in its normal direction in all branches. Besides the direct-current circuit there is a connection between the windings 6 and 7, i. e., each terminal of the winding 6 is connected to each terminal of the winding 7 through valves 12 and 12' respectively. It is quite indifferent as to how the terminals to be connected are allotted in pairs with respect to one another, it being only essential that the conducting direction of the valves 12 and 12' be such that the rectified current flowing in the normal direction may flow without hinderance in both branches of the direct-current circuit.

What is claimed is:

1. An electric conversion system for transferring electric energy between a single-phase circuit and a direct-current circuit comprising two parallel connected single-phase transformers, primary and secondary winding terminals on each of said transformers, means including phase shifting means for connecting said primary terminals to the single-phase circuit, means including rectifying means for connecting the secondary terminals of one transformer to one terminal of the direct-current circuit and similar means for connecting the secondary of the other transformer to the opposite terminal of the direct-current circuit, all of the rectifying means connected to one secondary being conductive in one direction and the rectifying means connected to the other transformer being conductive in the opposite direction, cross ties between similar terminals of the parallel transformers and rectifying means in said cross connections, all of said rectifying means being conductive in the same conducting direction with respect to the direct-current circuit.

2. An electric conversion system comprising a single-phase alternating-current source, a direct-current load, two parallel transformers having their primary windings connected to the single-phase source, means connected between said transformers and said source for shifting the phase of said transformers with respect to each other, a secondary winding on each of said parallel transformers, all the terminals of one of said secondary windings being connected to one terminal of said direct-current load, all of the terminals of the other of said secondary windings being connected to the opposite terminal of the direct-current load, rectifying means in each terminal connection, all of the rectifying devices connected to one secondary winding being conductive in the same direction, and all the rectifying devices connected to the other secondary winding being conducting in the opposite direction, cross connections between the respective terminals of the secondary windings, rectifying means in said cross connections, said rectifying means in said cross connections being all conductive in the same direction.

3. A rectifier system for transferring electric energy between a single-phase circuit and a direct-current circuit comprising two parallel single-phase transformers, means including phase-shifting means for connecting said parallel transformers to the single-phase circuit, means including rectifying means for connecting the transformers to the direct-current circuit, one of said transformers being connected to one terminal of the direct-current circuit and the other transformer to the opposite terminal of the direct-current circuit, cross connections between said transformers, said cross connections including rectifying means, all of said rectifying means being conductive in the same conducting direction with respect to the direct-current circuit.

FRITZ RAMPACHER.